(12) United States Patent  
Chen et al.

(10) Patent No.: US 8,970,891 B2  
(45) Date of Patent: Mar. 3, 2015

(54) MULTI-CORE PROCESSOR BASED IMAGE DATA ROTATING PROCESSING SYSTEM FOR HIGH-SPEED DIGITAL TEXTILE PRINTER AND METHOD

(71) Applicant: Zhejiang University, Hangzhou, Zhejiang Province (CN)

(72) Inventors: Yaowu Chen, Hangzhou (CN); Xiang Tian, Hangzhou (CN); Yeqiang Han, Hangzhou (CN)

(73) Assignee: Zhejiang University, Hangzhou, Zhejiang Province (CN)

( * ) Notice: Subject to any disclaimer, the term of this patent is extended or adjusted under 35 U.S.C. 154(b) by 0 days.

(21) Appl. No.: 14/370,007

(22) PCT Filed: Dec. 25, 2012

(86) PCT No.: PCT/CN2012/087384  
§ 371 (c)(1),  
(2) Date: Jun. 30, 2014

(87) PCT Pub. No.: WO2013/097693  
PCT Pub. Date: Apr. 7, 2013

(65) Prior Publication Data  
US 2014/0362408 A1    Dec. 11, 2014

(30) Foreign Application Priority Data

Dec. 30, 2011    (CN) .......................... 2011 1 0456272

(51) Int. Cl.  
  *G06F 3/12*    (2006.01)  
  *G06K 15/02*    (2006.01)

(52) U.S. Cl.  
  CPC .................................. *G06K 15/021* (2013.01)  
  USPC .......................................... 358/1.15; 358/1.1

(58) Field of Classification Search  
  USPC ................................................. 358/1.15, 1.1  
  See application file for complete search history.

(56) References Cited

FOREIGN PATENT DOCUMENTS

| CN | 101790016 A | 7/2010 |
|---|---|---|
| CN | 102555550 A | 7/2012 |
| JP | 2009-116450 A | 5/2009 |
| JP | 2009-241485 A | 10/2009 |

OTHER PUBLICATIONS

Wang, Chengliang et al., Research & Application of Multi-core Image Processing Parallel Design Scheme, Computer Engineering, Jul. 2011, vol. 37, No. 14, pp. 220-221.

*Primary Examiner* — Martin Mushambo  
(74) *Attorney, Agent, or Firm* — Jacobson Holman PLLC; Jiwen Chen

(57) ABSTRACT

The present invention discloses a multi-core processor based image data rotating processing system for high-speed digital textile printers, including a data receiving equipment, a data analysis and processing equipment, a data transmission channel and data output equipment. The present invention also discloses a multi-core processor based image data rotating processing method for high-speed printers; it aims to receive data via the Ethernet interface, use numerous cores of the processor for parallel data processing, and implement data output via FPGA. As compared with prior arts, the system and method of the present invention can significantly improve the data gyration efficiency and output, and implement high yield of digital textile printers.

2 Claims, 2 Drawing Sheets

MULTI-CORE PROCESSOR BASED IMAGE DATA ROTATING PROCESSING SYSTEM FOR HIGH-SPEED DIGITAL TEXTILE PRINTER AND METHOD

This is a U.S. national stage application of PCT Application No. PCT/CN2012/087384 under 35 U.S.C. 371, filed Dec. 25, 2012 in Chinese, claiming the priority benefit of Chinese Application No. 201110456272.9, filed Dec. 30, 2011, which is hereby incorporated by reference.

FIELD OF THE INVENTION

The present invention relates to the technical filed of digital textile printing in particular, to a multi-core processor based high-speed textile printing machine image data rotating processing system and method.

BACKGROUND ARTS

Accelerated development of digital textile printers and rapid growth of digital printing industry have put forward higher requirements for digital printing speed. Under such circumstances, a control device of quicker data processing and transmission is required to achieve data processing and transmission of digital textile printers.

In recent years, FPGA (Field Programmable Gate Array) technology has witnessed an accelerated development, which has transited from the original application for merely logic alternation to complicated computation intensive application. Newly launched FPGA devices not only integrate with abundant configurable logic blocks (CLB), they also include a large number of DSP (Digital Signal Processing) units and block rams (BRAM) for intensive PC application, and RocketIO GTP receiver unit for high-speed serial communication. To facilitate debugging of FPGA, FPGA manufacturers have also developed chip logic analysis and testing tools (such as ChipScope developed by Xilinx) in an attempt to ensure feasible high-performance computation in terms of hardware and software.

The Chinese Patent Application No. 201010039579.4 has disclosed a rotating processing system, method and technology for image data of high-speed digital textile printer. This device mainly comprises a data receiving equipment, a data analysis equipment, a data processing equipment, a data transmission channel and a data transmission equipment. However, data gyration efficiency and throughput of such processing technology is unsatisfactory in practical situation. Meanwhile, as data processing of such technology is implemented by FPGA, which has higher requirements for rotating processing of images in large quantity and performance of FPGA, it is difficult to ensure effective cost control. Moreover, due to such disadvantaged as stringent requirements for technical development personnel and high cost for upgrading of equipments, it is unlikely to satisfy increasing market demands for textile printers.

In view of requirements for customized interface and high-speed data transmission of digital textile printers, digital textile printers are in need of a special system for data processing. With regard to data processing of digital textile printers, especially bit based gyration, processing speed of common computers is unlikely to satisfy requirements for printers. Therefore, a special system will be needed to implement high-speed data gyration, and improve working efficiency of the printers.

Currently, the single-core processor is confronted with the bottleneck to the power consumption in terms of mere increase of dominant frequency. The multi-core processor will become a mainstream in the field of PC and embedded system in the future. The multi-core processor as manufactured by Tilera is based on the so called "mesh network" communication mechanism other than conventional BUS based communication modes. It is a two-dimensional (2D) communication mode that can significantly reduce the power consumption, and improve communication efficiency between each core. Power consumption of GX16-core CPU as manufactured by Tilera has been reduced to 22 W with memory bandwidth and dominant frequency up to 205 Gpbs and 1.25 GHz, respectively. Furthermore, this multi-core processor is provided with abundant network interfaces and high-speed transmission interfaces, such as PCI-EXPRESS interface, Stream IO interface and so on. Transmission speed of Stream IO interface is up to 20 Gpbs, which can fully satisfy the demand of modern processing systems for data transmission in large quantity.

SUMMARY OF THE INVENTION

In view of aforesaid technical defects of the prior arts, the present invention aims to provide a multi-core processor based rotating processing system and method for image data of high-speed digital textile printer that can improve data gyration efficiency and throughput, and achieve high yield for digital textile printers.

Technical Solution

A multi-core processor based rotating image data processing system for high-speed printer comprising:

a data receiving equipment used to receive original data to be processed;

a data analysis and processing equipment used to analyze original data received from the data receiving equipment, and obtain valid data for rotating processing;

a data transmission channel used to transmit valid data subjecting to rotating processing by the data analysis processing equipment;

a data output equipment used to receive valid data subjecting to rotating processing through the data transmission channel for output.

The data receiving equipment comprises two expanded gigabit Ethernet optical fiber interfaces of the multi-core processor.

The data analysis and processing equipment comprises all cores and 6 expanded DDR3 memory chips of the multi-core processor.

The data transmission channel comprises the Stream IO interface of the multi-core processor and expanded Stream IO interface of FPGA as interconnected with it.

The data output equipment comprises FPGA, an expanded DDR2 memory chip of FPGA and a nozzle control interface mono-board interconnected with FPGA; DDR2 memory chip is used to buffer valid data subjecting to rotating processing; whereas the nozzle control interface mono-board is used for parallel output of valid data subjecting to rotating processing and control of the nozzle.

A multi-core processor based rotating processing method for image data of high-speed digital textile printer, comprising the following steps:

(1) receiving original data to be processed by a gigabit Ethernet optical fiber interface;

(2) The multi-core processor aims decompressing original data received, analyzing file header of the data as per protocol, and extracting valid data for division into N data blocks (if the multi-core processor is provided with N cores, valid data is to be divided into N data blocks); N cores of the multi-core processor are used for rotating processing of N data blocks for combination;

(3) The multi-core processor will proceed with command exchange with FPGA through Stream IO BUS to check whether expanded DDR2 of FPGA has adequate space to store valid data subjecting to rotating processing; if so, the multi-core processor will proceed with write-in operation through Stream IO BUS, and transmit valid data subjecting to rotating processing to FPGA;

(4) FPGA firstly storing the valid data subjecting to rotating processing into DDR2 before extracting it for parallel output to the nozzle control interface mono-board at 128 bits; after that, the nozzle control interface mono-board is to be used for parallel output of valid data subjecting to rotating processing.

The system and device of the present invention can significantly improve the data gyration efficiency and throughput, and implement high yield of digital textile printers. If the processing system of prior arts is used to execute rotating processing of image data, it will take 10 seconds to process a 200 MB data. On the contrary, processing system and method of this invention can reduce the processing time to 2.5 seconds while maintaining a data throughput over 80 MB/s.

PREFERRED EMBODIMENTS OF THE INVENTION

To ensure special description of the present invention, technical solution and method of the present invention are described hereinafter in details as follows in combination with drawings and preferred embodiments.

Figure 1:
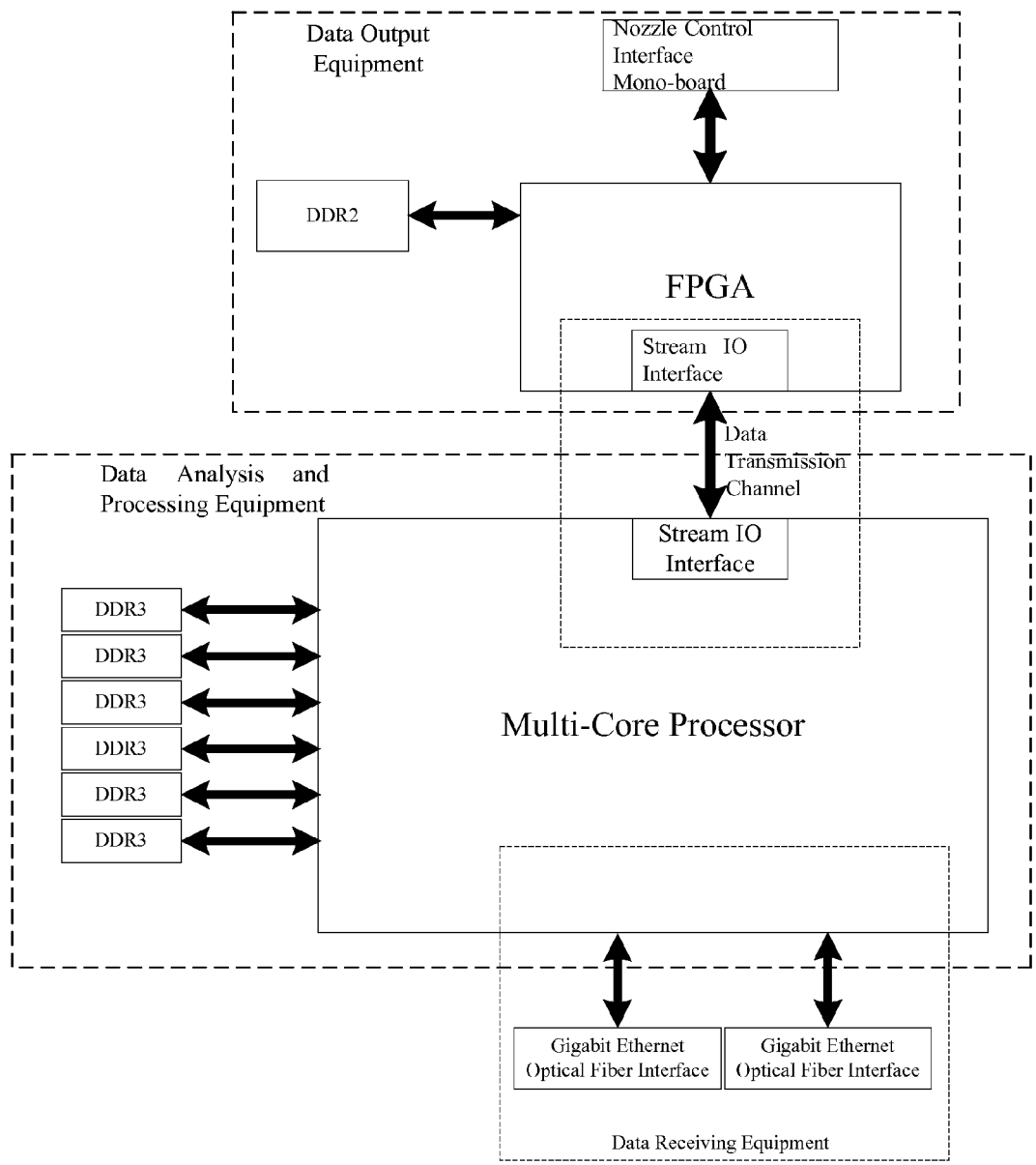
FIG. 1 is the structural diagram for the system of the present invention.

A multi-core processor based image data rotating processing system for high-speed textile printers as shown in FIG. 1, comprises a data receiving equipment, a data analysis and processing equipment connected with the data receiving equipment and a data output equipment connected with the data analysis and processing equipment through via a data transmission channel, wherein:

a data receiving equipment is used to receive original data to be processed; the data receiving equipment comprises two expanded gigabit Ethernet optical fiber interfaces of the multi-core processor;

a data analysis and processing equipment is used to analyze original data as received by the data receiving equipment, obtain valid data and conduct rotating processing of the obtained valid data; data analysis and processing equipment comprises all cores and 6 expanded DDR3 memory chips of the multi-core processor;

a data transmission channel is used to transmit valid data subjected to rotating processing by the data analysis processing equipment; the data transmission channel comprises a Stream IO interface of a multi-core processor and an expanded FPGA Stream IO interconnected with Stream IO interface;

a data output equipment is used to receive valid data subjected to rotating processing via the data transmission channel and output the valid data subjected to rotating processing; the data output equipment comprises a FPGA, an expanded DDR2 memory chip of the FPGA and a nozzle control interface plate interconnected with the FPGA; the DDR2 memory chip is used for buffer of valid data subjecting to rotating processing; whereas the nozzle control interface mono-board is used for parallel output of valid data subjecting to rotating processing and control of the nozzle.

TileGx multi-core processor (Tile-Gx16) as manufactured by Tilera is selected as the multi-core processor in this embodiment. This processor is provided with 16 cores with dominant frequency up to 1.2 GHz; whereas dominant frequency of the expanded DDR3 of the multi-core processor is up to 1,333 MHz; the FPGA is Stratix III EP3SL150 chip as manufactured by Altera.

Figure 2:
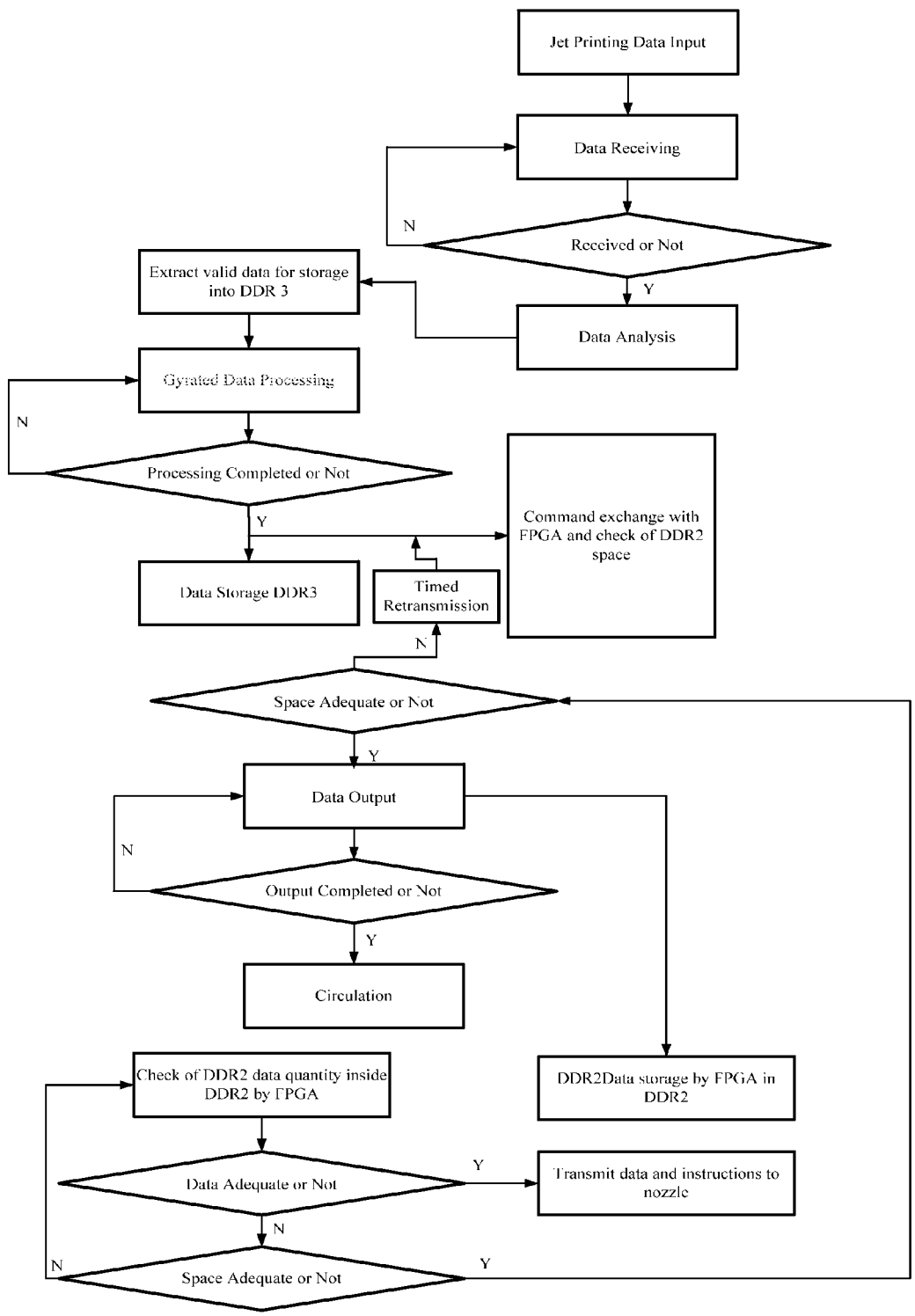
FIG. 2 is the flow chart for the method of the present invention.

As shown in FIG. 2, the processing method for multi-core processor based image data rotating processing system for high-speed printers in this embodiment, comprises the following steps:

(1) original data to be processed is received by the gigabit Ethernet optical fiber interface (image data to be printed by digital printing machine). As compared with conventional Ethernet interfaces, this interface has significantly improved the data transmission bandwidth, which can satisfy the requirement for printing by digital printing machines at a higher speed.

(2) the multi-core processor decompresses original data received, analyzes file headers of the data as per protocol, and extracts valid data for division into 16 data blocks; 16 cores of the multi-core processor are used for rotating processing of 16 data blocks and the rotated data blocks are combined.

The specific operation of rotating processing is as follows:

1. Data of one BYTE is to be read by the DDR3 each time to obtain the value for each byte through shift operation.

2. Further proceed with shift operation of 8 bits respectively for storage into the corresponding 8 bits inside the result register transferred as per bits or operation.

3. Obtain one array of transferred BYTE data through transposition of 8 lines of original data, and store it into the corresponding buffer of the DDR3.

4. Proceed with ergodic operation of data to be processed as per Steps 1-3;

(3) The multi-core processor will proceed with command exchange with the FPGA through StreamIO BUS to check whether expanded DDR2 of the FPGA has adequate space to store valid data subjecting to rotating processing; if so, the multi-core processor will write in the operation through StreamIO BUS, and transmit valid data subjecting to rotating processing to the FPGA;

(4) The FPGA will firstly store the valid data subjected to rotating processing into the DDR2 before extracting the valid data subjected to rotating processing for parallel output to the nozzle control interface mono-board at 128 bits; then using the nozzle control interface mono-board to control the nozzle to output the valid data subjected to rotating processing.

The nozzle of the digital textile printer is used to receive processed image data via the nozzle control interface mono-board, and print images to be printed on the carrier according to image data and instructions.

As verified through implementation, if the processing system of prior arts is used to execute rotating processing of image data, it will take 10 seconds to process a 200 MB data and the data throughout is only 20 MB/s. On the contrary, processing system and method of the present invention can reduce the processing time to 2.5 seconds while maintaining a data throughput over 80 MB/s. As manifested by data comparison, this embodiment can significantly improve the data rotation efficiency and throughput, and realize high yield of the digital textile printer.

The invention claimed is:

1. A multi-core processor based image data rotating processing system for a high-speed textile printer comprising:
   a data receiving equipment used to receive original data to be processed, wherein the data receiving equipment comprises two expanded gigabit Ethernet optical fiber interfaces of the multi-core processor;
   a data analysis and processing equipment used to analyze original data received by the data receiving equipment, and obtain valid data for rotating processing;
   a data transmission channel used to transmit valid data subjected to rotating processing by the data analysis and processing equipment, wherein the data transmission channel comprises a StreamIO interface of multi-core processor and an expanded FPGA StreamIO interconnected with the StreamIO interface;
   a data output equipment used to receive valid data subjected to rotating processing via the data transmission channel for output, wherein the data output equipment comprises a FPGA, an expanded DDR2 memory chip of the FPGA and a nozzle control interface plate interconnected with the FPGA;
   the data analysis and processing equipment comprises all cores of the multi-core processor and the multi-core processor's six expanded DDR3 memory chips.

2. A multi-core processor based rotating processing method for image data of a high-speed digital textile printer, comprising the following steps:
   (1) receiving original data to be processed by a gigabit Ethernet optical fiber interface;
   (2) the multi-core processor decompressing original data received, analyzing file headers of the original data according to a protocol, and extracting valid data for division into 16 data blocks; using 16 cores of the multi-core processor for rotating processing of 16 data blocks and combining the 16 data blocks;
   wherein the rotating processing is as follows:
   (a) reading one BYTE data from DDR3 each time to obtain a value for each bit through a shift operation;
   (b) respectively conducting another shift operation to 8 bits for storing into corresponding 8 bits inside a result register transferred as per bits or operation;
   (c) obtaining one array of transposed BYTE data through transposition of 8 lines of original data, and storing the transposed BYTE data into a corresponding buffer of the DDR3; and
   (d) conducting an ergodic operation of data to be processed according to the above steps (a) through (c);
   (3) the multi-core processor proceeding with command exchange with FPGA through StreamIO BUS to check whether expanded DDR2 of the FPGA has adequate space to store valid data subjected to rotating processing; if so, the multi-core processor proceeding with write-in operation through StreamIO BUS, and transmitting valid data subjected to rotating processing to the FPGA; and
   (4) the FPGA firstly storing the valid data subjected to rotating processing into the DDR2 before extracting the data for parallel output to a nozzle control interface mono-board at 128 bits; then using the nozzle control interface mono-board to control the nozzle to output the valid data subjected to rotating processing.

* * * * *